United States Patent
Varkey et al.

(10) Patent No.: US 9,767,938 B2
(45) Date of Patent: Sep. 19, 2017

(54) CABLES AND METHODS OF MAKING CABLES

(71) Applicant: Schlumberger Technology Corporation, Sugar Land, TX (US)

(72) Inventors: Joseph Varkey, Missouri City, TX (US); Sheng Chang, Sugar Land, TX (US); Burcu Unal Altintas, Richmond, TX (US); Willem Wijnberg, Houston, TX (US); Qingdi Huang, Sugar Land, TX (US); Jushik Yun, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/682,956

(22) Filed: Apr. 9, 2015

(65) Prior Publication Data
US 2015/0294762 A1    Oct. 15, 2015

Related U.S. Application Data

(60) Provisional application No. 61/977,401, filed on Apr. 9, 2014.

(51) Int. Cl.
| | |
|---|---|
| *H01B 3/30* | (2006.01) |
| *F16L 11/127* | (2006.01) |
| *G01V 1/20* | (2006.01) |
| *H01B 3/44* | (2006.01) |
| *F16L 11/08* | (2006.01) |
| *F16L 11/12* | (2006.01) |

(52) U.S. Cl.
CPC ............ *H01B 3/307* (2013.01); *F16L 11/088* (2013.01); *F16L 11/12* (2013.01); *F16L 11/124* (2013.01); *F16L 11/127* (2013.01); *G01V 1/201* (2013.01); *H01B 3/305* (2013.01); *H01B 3/445* (2013.01); *F16L 2201/30* (2013.01); *F16L 2201/60* (2013.01)

(58) Field of Classification Search
USPC ................. 174/102 R; 439/585; 385/104
See application file for complete search history.

(56) References Cited

U.S. PATENT DOCUMENTS

| | | | | |
|---|---|---|---|---|
| 4,317,000 A | * | 2/1982 | Ferer | H01B 7/182 138/130 |
| 4,679,600 A | * | 7/1987 | Dougherty | B29C 53/564 138/128 |
| 4,730,894 A | * | 3/1988 | Arroyo | G02B 6/4411 385/111 |

(Continued)

OTHER PUBLICATIONS

U.S. Appl. No. 14/682,956, Krystal Robinson.*

*Primary Examiner* — Timothy Thompson
*Assistant Examiner* — Krystal Robinson
(74) *Attorney, Agent, or Firm* — Trevor G. Grove

(57) ABSTRACT

A cable that include a hose having a conductor located thereabout. A first strength member layer is located about the conductor. A second strength member layer is located about the first strength member layer. A first jacket is located about the second strength member layer. The first jacket is fiber-reinforced. A second jacket is located about the first jacket. The second jacket is a contrasting color to the first jacket.

11 Claims, 6 Drawing Sheets

(56) References Cited

U.S. PATENT DOCUMENTS

| | | | | |
|---|---|---|---|---|
| 5,520,223 A * | 5/1996 | Iorio | | B29C 63/486 |
| | | | | 138/137 |
| 5,689,601 A * | 11/1997 | Hager | | G02B 6/4494 |
| | | | | 385/100 |
| 5,861,578 A * | 1/1999 | Hake | | H01B 3/421 |
| | | | | 174/120 R |
| 5,921,285 A * | 7/1999 | Quigley | | D04C 1/06 |
| | | | | 138/114 |
| 6,403,889 B1 * | 6/2002 | Mehan | | B32B 1/08 |
| | | | | 174/120 R |
| 6,898,354 B2 * | 5/2005 | Kim | | G02B 6/4483 |
| | | | | 385/100 |
| 7,920,765 B2 * | 4/2011 | Varkey | | H01B 7/046 |
| | | | | 385/101 |
| 2004/0045735 A1 * | 3/2004 | Varkey | | H01B 3/441 |
| | | | | 174/120 R |
| 2006/0151194 A1 * | 7/2006 | Varkey | | H01B 7/046 |
| | | | | 174/102 R |
| 2009/0087154 A1 * | 4/2009 | Bradley | | G02B 6/4432 |
| | | | | 385/113 |
| 2009/0242194 A1 * | 10/2009 | Varkey | | F16L 11/127 |
| | | | | 166/242.2 |
| 2010/0031623 A1 * | 2/2010 | Vanderbeken | | D07B 1/0613 |
| | | | | 57/213 |
| 2011/0229099 A1 * | 9/2011 | Hartog | | G02B 6/4401 |
| | | | | 385/104 |

* cited by examiner

CABLES AND METHODS OF MAKING CABLES

CROSS-REFERENCE TO RELATED APPLICATIONS

This Application claims benefit of and priority to U.S. Provisional Application Ser. No. 61/977,401, which was filed Apr. 9, 2014, and entitled "Cables and Methods of Making Cables". The entirety of the foregoing is incorporated herein by reference.

FIELD OF THE DISCLOSURE

The disclosure generally relates to cables and methods of making cables.

BACKGROUND

In marine seismic activities, pulses from air guns are used to generate shock waves. The shock waves propagate into the substrate beneath the water. The shock waves are reflected back and are detected using sensors or the like.

The air guns are connected to gun cables that provide pressurized air to gun sources. The gun sources generate a wave that is reflected from land below the water. The reflected waves are detected and used to perform exploration activities.

The gun cables are deployed from a vessel and slide about the deck of the vessel. The cables will damage the deck of the vessel if the cables are too abrasive. The gun cables, however, are susceptible to damage if they do not have sufficient strength.

SUMMARY

An example of a cable includes a hose. A conductor is located about the hose. A first strength member layer is located about the at least one conductor, and a second strength member layer is located about the first strength member layer. A first jacket is located about the second strength member layer. The first jacket is fiber-reinforced. A second jacket is located about the first jacket. The second jacket is a contrasting color to the first jacket.

Another example of a cable includes a hose. The hose has a conductor, a strength member layer, a first jacket, and a second jacket located thereabout. The first jacket is a polymer that is fiber reinforced, and the second jacket is a polymer.

An example method of making a cable includes placing at least one conductor about a hose. The method also includes placing a first layer of coated strength members about the conductor. A second layer of coated strength members is placed about the first layer of coated strength members. The method also includes placing a first jacket about the second layer of coated strength members. The first jacket is a polymer reinforced with fibers. The method further includes placing a second jacket about the first jacket. The second jacket is a polymer.

DETAILED DESCRIPTION

Figure 1:
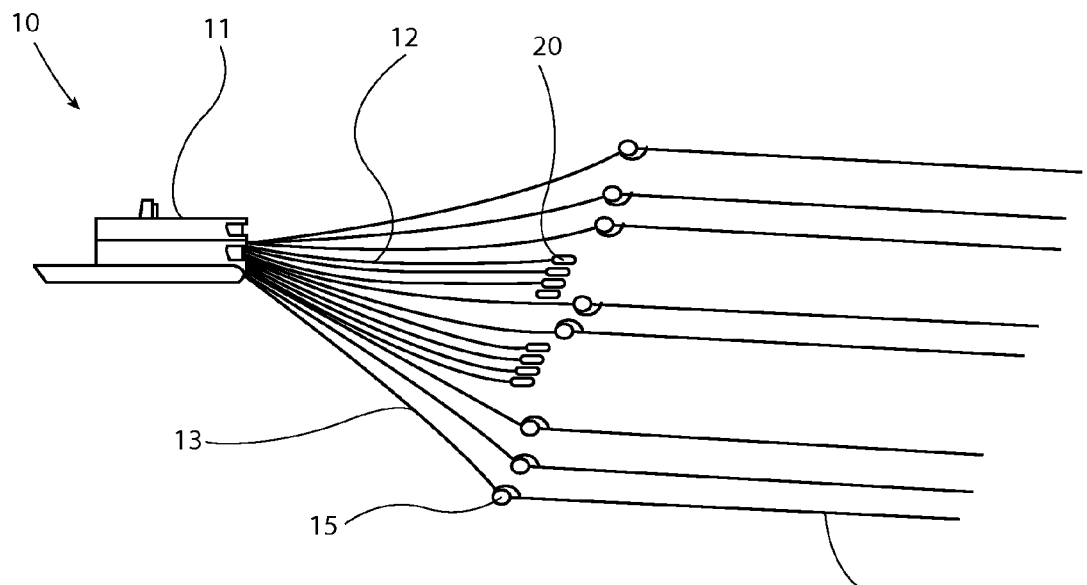
FIG. 1 depicts an example marine seismic exploration configuration.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

An example cable includes a hose. The hose can be any air gun hose. The hose can have any number of conductors located thereabout. The conductors can be mini-quad conductors, single strand conductors, optical fiber conductors, or the like.

In an embodiment, the hose can be a reinforced hose. The reinforced hose can include an inner hose layer made of a first material. The inner hose layer can have a flow path formed therethrough. The reinforced hose can also include a reinforcement layer disposed about the inner hose layer. The reinforcement layer can be made from a second material. The second material can have fibers located therein. The first material and the second material can chemically bond to form a matrix. For example, the first material and the second material can be chemically compatible and can bond with one another to form the matrix. In another example, a tie layer can be located between the reinforcement layer and the inner layer, and the tie layer can be chemically compatible with the first material and the second material, accordingly, the tie layer can chemically bond with the first material and the second material forming the matrix.

In an embodiment, the reinforcement layer can include a composite tape located about the inner hose layer. Gaps can be located between edges of the composite tape, and the composite tape can be encapsulated by the second material.

In another embodiment, the reinforcement layer can include a spring located about the inner hose layer, and the spring can be encapsulated by the second material.

In an embodiment an outer hose layer can be located about the reinforcement layer, and the outer hose layer can be chemically bonded with the reinforcement layer.

The cable can also include a first strength member layer located about the conductors. The first strength member layer can have a plurality of coated strength members. The coated strength members can be metallic strength members coated with a polymer. Other types of suitable coatings and strength members can be used.

A second strength member layer is located about the first strength member layer. The second strength member layer can include another plurality of coated strength members. The coated strength members can be metallic strength members coated with a polymer. Other types of suitable coatings and strength members can be used.

A first jacket is located about the second strength member layer. The first jacket can be fiber-reinforced. The first jacket can be made from any material. For example, the first jacket can be made from a polymer. Illustrative polymers include Nylon 12, fluropolymer, or the like. The fibers reinforcing the first jacket can be carbon fibers, glass fibers, metal fibers, or other suitable fibers.

A second jacket can be located about the first jacket. The second jacket can be a contrasting color to the first jacket. For example, the first jacket can be black and the second jacket can be yellow. The second jacket can be made from any suitable material. The second jacket can be made from a material with a low friction coefficient. Illustrative materials include polymers, fluropolymer, Ethylene tetrafluoroethylene ("ETFE"), Fluorinated ethylene propylene ("FEP"), or the like. Illustrative fluropolymers include perfluoroalkoxy ("PFA"), perfluoro methyl alkoxy ("MFA"), and polyvinylidene fluoride ("PVDF").

In an embodiment of the example cable, a tie layer is located between the first jacket and the second jacket. The tie layer can be a material that is compatible with the material of the first jacket and the material of the second jacket. Accordingly, the tie layer can bond with both the jackets.

An example method of making a cable includes placing any number of conductors about a hose. The conductors can be cabled about the hose. The method can also include placing a first strength member layer about the conductor. The strength members can be coated strength members. The coated strength members can be heated as they are cabled about the hose. The coating can at least partially melt and can be formed into a circular profile. The coating can deform to fill interstitial spaces between the strength member layers.

The example method also includes placing a second strength member layer about the first strength member layer. The strength members in the second strength member layer can be coated strength members. The coated strength members of the second strength member layer can be heated and the coating can at least partially melt, and the second strength member layer can be formed into a circular profile. The coating can deform to fill interstitial spaces between the strength member layers.

The method can further include placing a first jacket about the second strength member layer of coated strength members. The first jacket can include a polymer reinforced with fibers. A second jacket can be placed about the first jacket. The second jacket can be a polymer.

An embodiment of the example method can include placing a tie layer between the first jacket and the second jacket. The tie layer can be a material that is compatible with the material of the first jacket and the material of the second jacket.

FIG. 1 depicts an example marine seismic exploration configuration.

The system 10 includes a vessel 11 connected with gun cables 12, lead-in cables 13, seismic streamer cables 14, and monowing adapter cables 15.

The gun cables 12 provide pressurized air to the gun sources 20. The gun sources release impulses of air, sending out sound waves, which reflect off terrain below the water and are detected by the seismic streamer cables 14. The seismic streamer cables 14 are connected with the vessel by the monowing adapter cables 15 and lead-in cables 13. The lead-in cables carry data from the seismic streamer cables 14 to the vessel 11.

Figure 2:
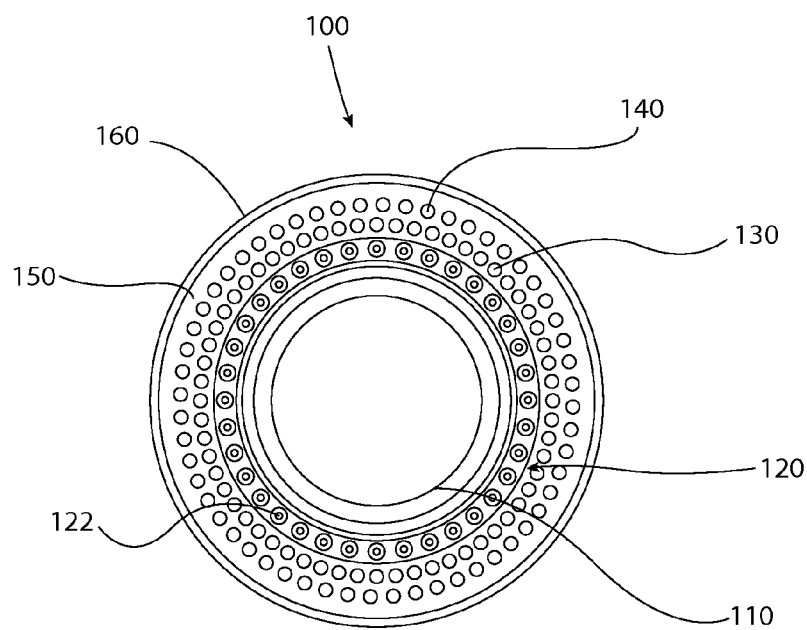
FIG. 2 depicts an example cable.

FIG. 2 depicts an example cable.

The cable 100 provides a multi-layer cable. The cable 100 includes a hose 110. The hose 110 can be any suitable hose. The hose can be a high pressure hose rated for a pressure up to about 2,000 psi.

A conductor layer 120 is located about the hose 110. The conductor layer 120 includes any number of conductors 122.

Numerous types of conductors can make up the conductor layer 120. The types of conductors can include optical fiber conductors, stranded conductors, mini-quad conductors, or other known or future known conductors. The conductors 122 can be cabled about the hose 110 to form the conductor layer 120.

A first strength member layer 130 and a second strength member layer 140 are also located about the hose. The first strength member layer 130 and the second strength member layer 140 can be bonded with one another. In an embodiment, the first strength member layer 130 and the second strength member layer 140 can be separated from one another. The strength members of the first strength member layer 130 and the second strength member layer 140 can be armor wires coated with an insulating material, such a polymer.

A first jacket 150 is disposed about the hose 110. The first jacket 150 can be made from a polymer. The polymer can be Nylon 12 or similar polymer. The first jacket 150 is fiber reinforced. The fibers can be carbon fibers, glass fibers, or other suitable fibers.

A second jacket 160 is also disposed about the hose 110. The second jacket 160 is made from a material that is compatible with the first jacket 150, allowing the first jacket 150 and the second jacket 160 to bond with one another. For example, the second jacket 160 can be made from ETFE or FEP, and the first jacket can be made from Nylon 12. Of course, either jacket can be made from any suitable material.

Figure 3:
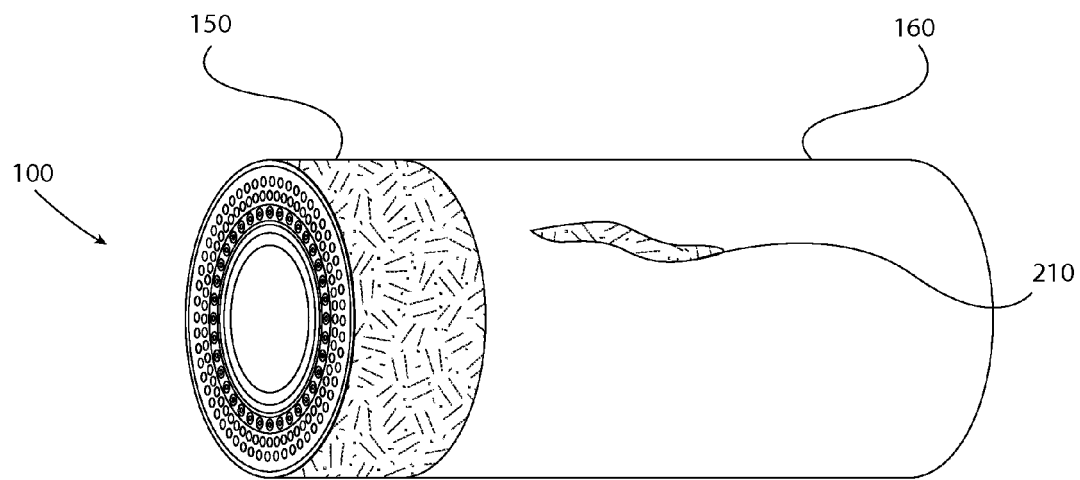
FIG. 3 depicts an isometric view of the cable of FIG. 2 with a second jacket that is damaged.
Figure 4:
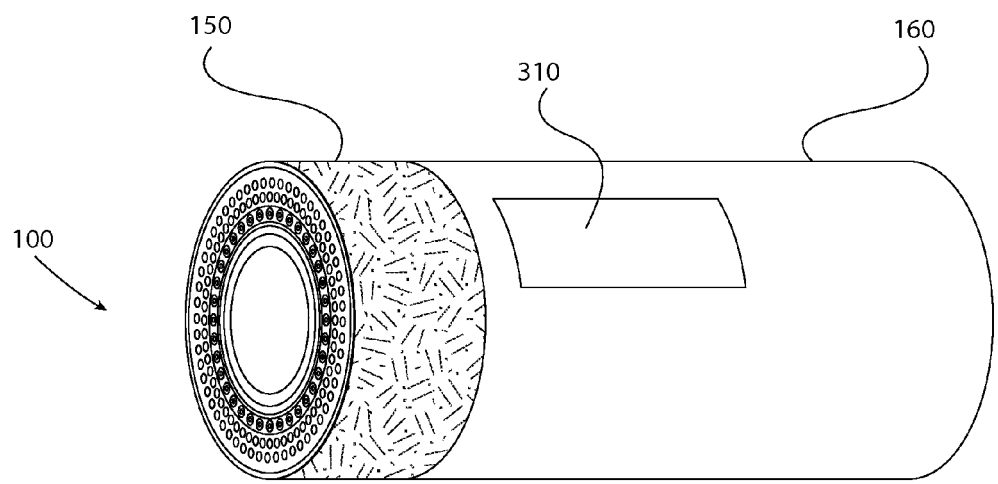
FIG. 4 depicts an isometric view of the cable of FIG. 3 with the second jacket repaired.

FIG. 3 depicts an isometric view of the cable of FIG. 2 with a second jacket that is damaged. FIG. 4 depicts an isometric view of the cable of FIG. 3 with the second jacket repaired.

Referring to FIGS. 3 to 4, the example cable 100 has a damaged portion 210 in the second jacket 160. The second jacket 160 is made of a color that is distinguishable from the color of the first jacket 150. Accordingly, damage in the second jacket 160 can be detected visually before that damage spreads to the other portions of the cable 100.

For example, a patch 310 can be used to repair the damaged portion 210. The patch 310 can be applied to the cable 100 in the field or at a remote location.

Figure 5:
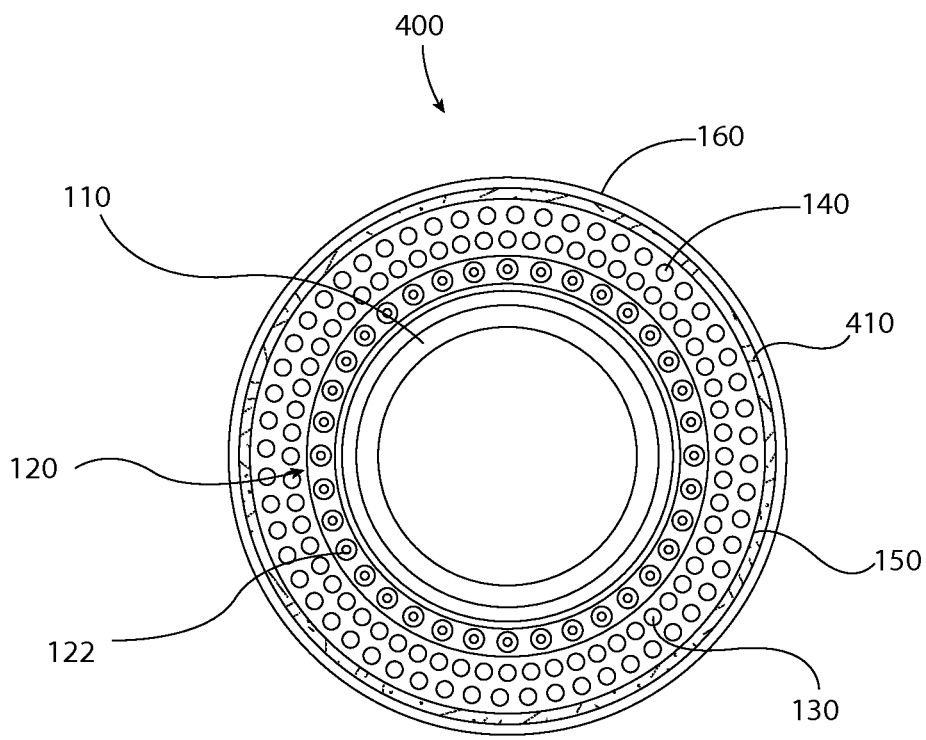
FIG. 5 depicts another example cable.

FIG. 5 depicts another example cable.

The example cable 400 includes the hose 110. The conductor layer 120 includes any number of conductors 122.

The example cable 400 includes the first strength member layer 130 and the second strength member layer 140 located about the hose 110.

The first strength member layer 130 and the second strength member layer 140 have a plurality of coated strength members. The strength members can be metallic strength members coated with a polymer.

The first jacket 150 is located about the hose 110. The second jacket 160 is also located about the hose 110. A tie layer 410 is located between the first jacket 150 and the second jacket 160. The tie layer 410 can be made form a material that is chemically compatible with the material of the first jacket 150 and the second jacket 160, thereby, allowing the tie layer to bond with the first jacket 150 and the second jacket 160.

Figure 6:
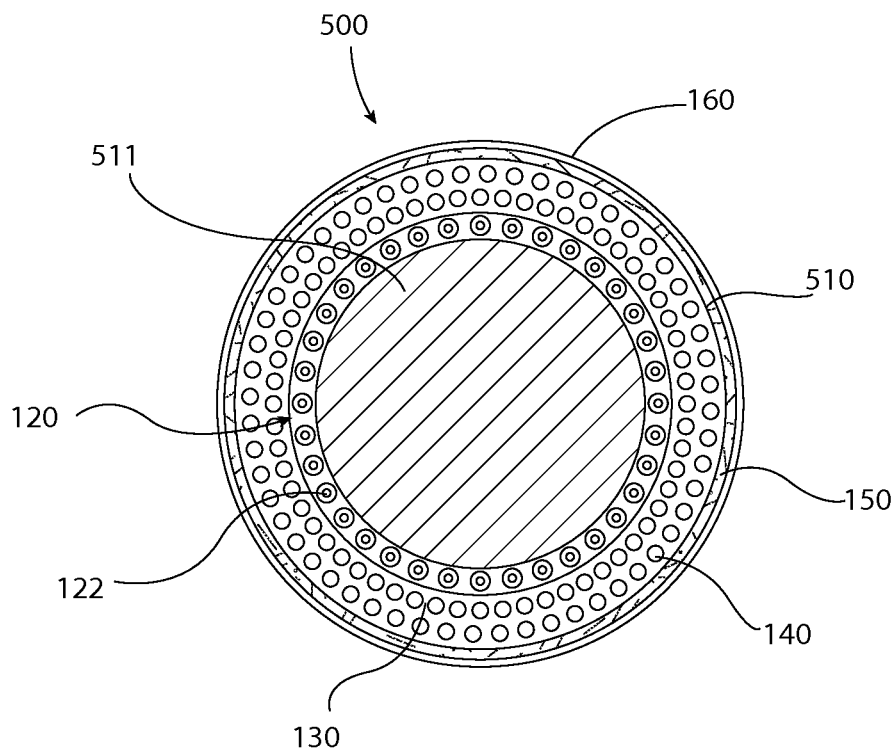
FIG. 6 depicts another example cable.

FIG. 6 depicts another example cable.

The example cable 500 includes a central component 511. The central component 511 can be any material. The conductor layer 120 includes any number of conductors 122.

The example cable 500 includes the first strength member layer 130 and the second strength member layer 140 located about the core 511.

The first strength member layer 130 and the second strength member layer 140 have a plurality of coated strength members. The strength members can be metallic strength members coated with a polymer.

The first jacket 150 is located about the hose 110. The second jacket 160 is also located about the hose 110. A tie layer 510 is located between the first jacket 150 and the second jacket 160. The tie layer 510 can be made from a material that is chemically compatible with the material of the first jacket 150 and the second jacket 160, thereby, allowing the tie layer to bond with the first jacket 150 and the second jacket 160.

Figure 7:
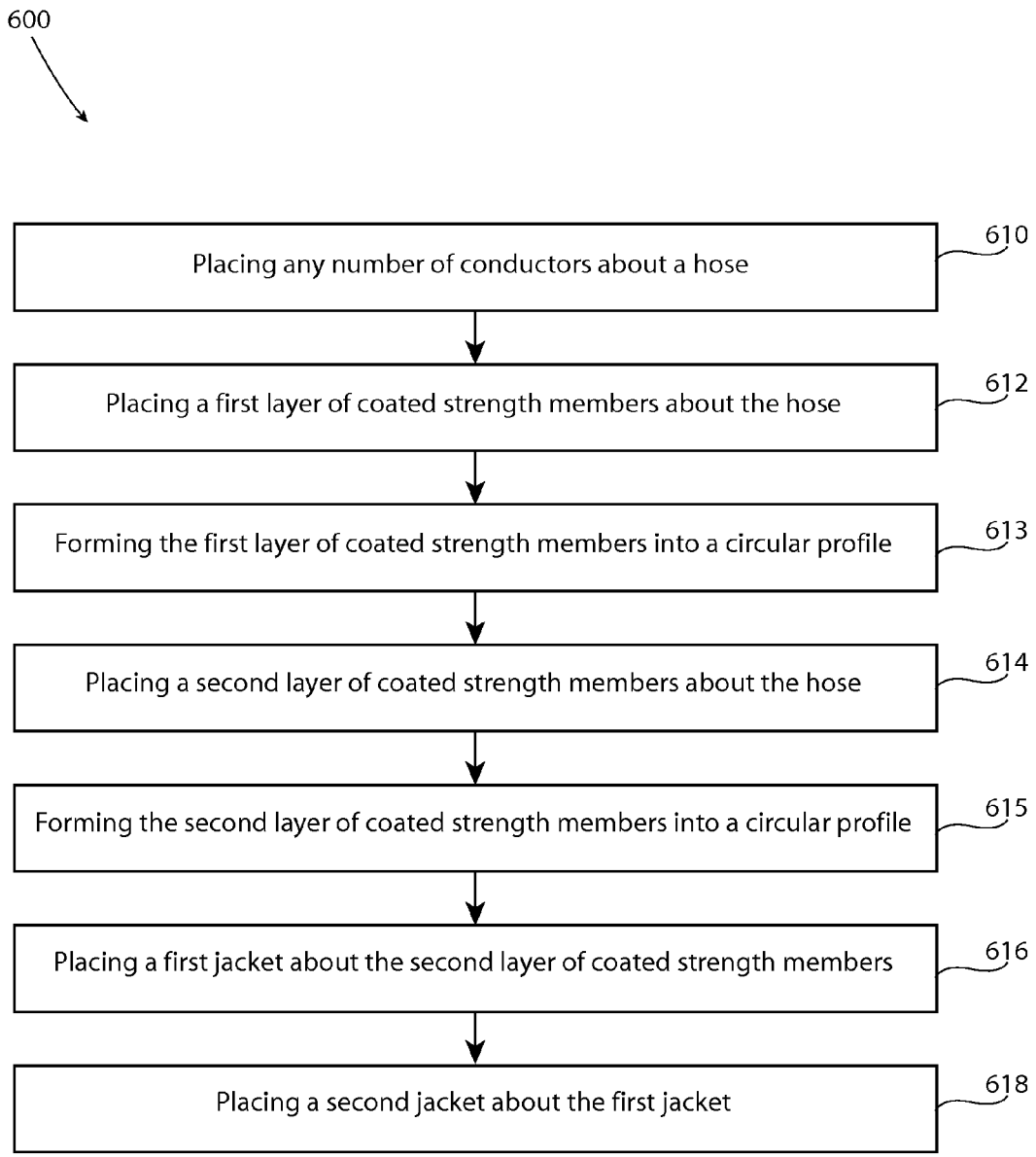
FIG. 7 depicts an example method of making a cable.

FIG. 7 depicts an example method of making a cable.

The method 600 is depicted as a series of operations or blocks.

The method 600 includes placing any number of conductors about a hose (Block 610).

The method 600 also includes placing a first layer of coated strength members about the hose (Block 612). The coated strength members can be heated as the first layer of coated strength members are provided about the hose. The coating can be melted allowing the coating to fill interstitial spaces between the strength members. The method can also include forming the first layer of coated strength members into a circular profile (Block 613). The first layer of coated strength members can be formed into a circular by a shaping die.

The method 600 can also include placing a second layer of coated strength members about the hose (Block 614). The coated strength members can be heated as the second layer of coated strength members are provided about the hose. The coating can melt allowing the coating to fill interstitial spaces between the strength members in the second layer. The method can also include forming the second layer of coated strength members into a circular profile (Block 615). The second layer of coated strength members can be formed into a circular profile using a shaping die.

The example method 600 is further depicted as including placing a first jacket about the second layer of coated strength members (Block 616). The first jacket can be a polymer reinforced with fibers.

The example method 600 also includes placing a second jacket about the first jacket (Block 618). The second jacket can be a polymer.

Figure 8:
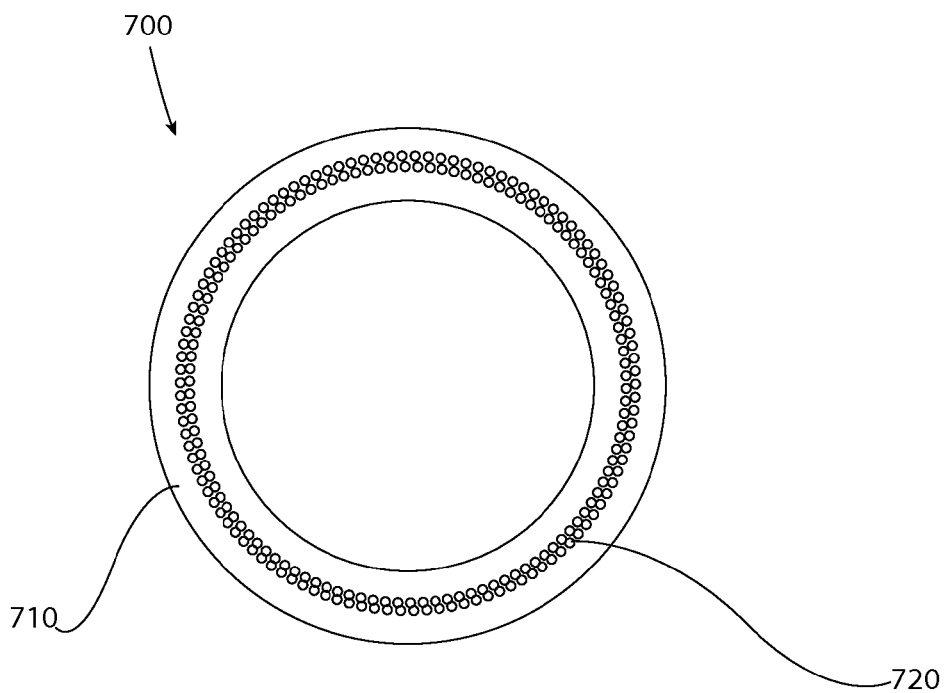
FIG. 8 depicts an example hose.

FIG. 8 depicts an example hose. The hose 700 includes a hose layer 710. The hose layer 710 can be made from ETFE, nylon, fluoropolymer, thermoplastic elastomer, thermoplastic, metallocene-catalyzed linear low density polyethylene (MLLDPE), middle or low density polyethylene (MLDPE), maleated high-density polyethylene (MHDPE), linear low density polyethylene (LLDPE), Low-density polyethylene (LDPE), High-density polyethylene (HDPE), Polypropylene (PP), ethylene-propylene copolymer (EPC), or the like.

The hose layer 710 can have a reinforcement layer 720 located therein. Any number of reinforcement layers can be located in the hose layer. The reinforcement layers 720 can be pultruded into hose layer or otherwise located therein using now know or future known techniques. The reinforcement layer 720 can be a continuous fiber or segmented fibers. The reinforcement layer 720 can be made from fibers of carbon, glass, quarts, other synthetic materials, or the like.

Figure 9:
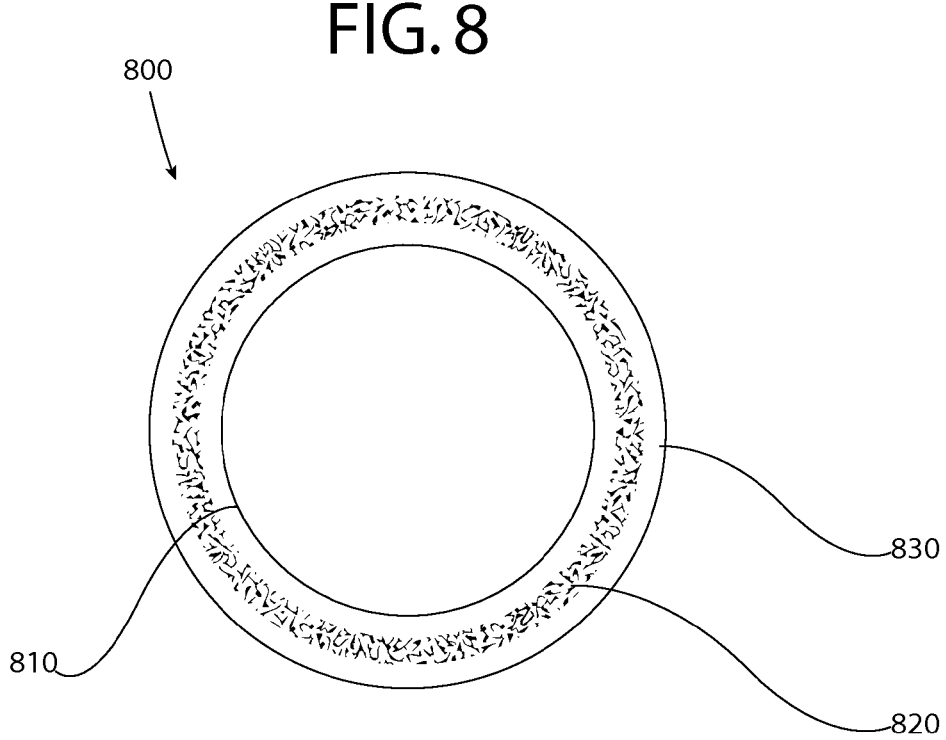
FIG. 9 depicts another example hose.

FIG. 9 depicts another example hose. The hose 800 can include a first hose layer 810. The first hose layer 810 can be made from a first material. The first material can be ETFE, nylon, fluoropolymer, thermoplastic elastomer, thermoplastic, metallocene-catalyzed linear low density polyethylene (MLLDPE), middle or low density polyethylene (MLDPE), maleated high-density polyethylene (MHDPE), linear low density polyethylene (LLDPE), Low-density polyethylene (LDPE), High-density polyethylene (HDPE), Polypropylene (PP), ethylene-propylene copolymer (EPC), or the like.

The first hose layer 810 can be chemically bonded with a reinforcement layer 820. The reinforcement layer 820 can be made from a second material that has fibers located therein. The second material can be ETFE, nylon, fluoropolymer, thermoplastic elastomer, thermoplastic, MLLDPE, MLDPE, MHDPE, LLDPE, LDPE, HDPE, PP, EPC, or the like.

In an example of the hose 800 the first material can be ETFE and the second material can be nylon, accordingly the first hose layer 810 can chemically bond with the reinforcement layer 820. In another example, the first material can be MLDPE that bonds with nylon and the second material can be nylon, allowing the first hose layer 810 to chemically bond with the reinforcement layer 820. In another example, the first material can be LLDPE, LDPE, HDPE, PP, or EPC and the second material can be nylon, and a tie layer that bonds with the first material and the second material can be located between the first hose layer 810 and the reinforcement layer 820.

The hose 800 also has an outer hose layer 830 located about the reinforcement layer 820. The outer hose layer can be nylon or another material.

Figure 10:
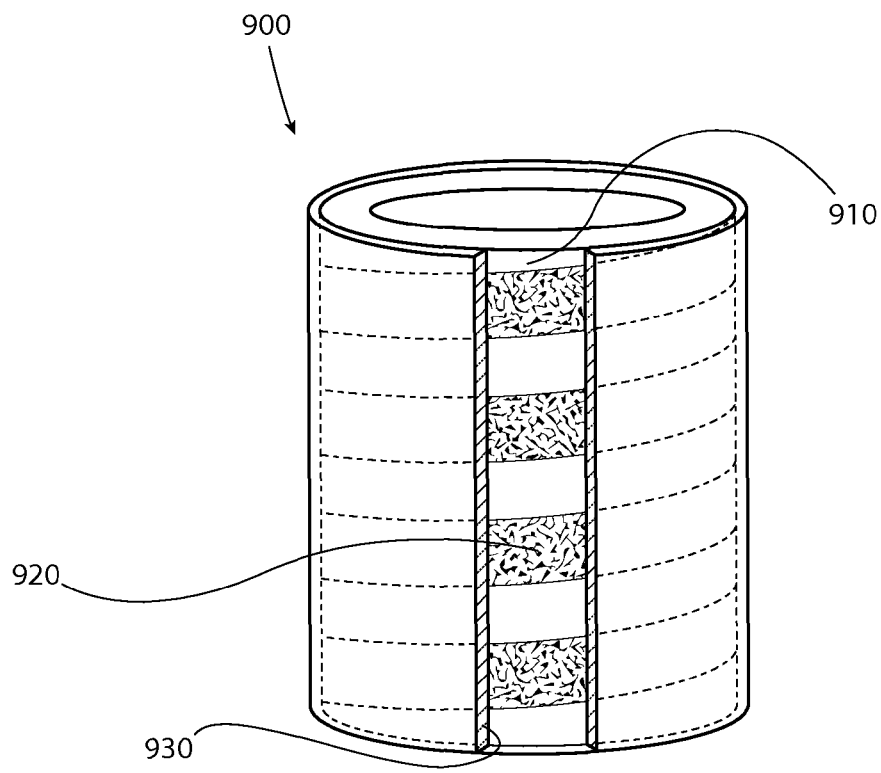
FIG. 10 depicts an example hose.

FIG. 10 depicts an example hose. The hose 900 includes an inner hose layer 910. The inner hose layer 910 can be made from a first material. The first material can be ETFE, nylon, fluoropolymer, thermoplastic elastomer, thermoplastic, MLLDPE, MLDPE, MHDPE, LLDPE, LDPE, HDPE, PP, EPC, or the like.

A reinforcement layer can be located about the inner hose layer 910. The reinforcement layer includes a composite tape 920 and a second material 930. A portion of the second material 930 has been removed to show the inner hose layer 910 and the composite tape 920 arranged about the inner hose layer 910. The composite tape 920 can be wrapped about the first hose layer, and gaps can be located between strips of the composite tape. The second material 930 can encapsulate the composite tape 920 and chemically bond with the inner hose layer 910, via the gaps between the strips of the composite tape. The second material can be ETFE, nylon, fluoropolymer, thermoplastic elastomer, thermoplastic, MLLDPE, MLDPE, MHDPE, LLDPE, LDPE, HDPE, PP, EPC, or the like.

Figure 11:
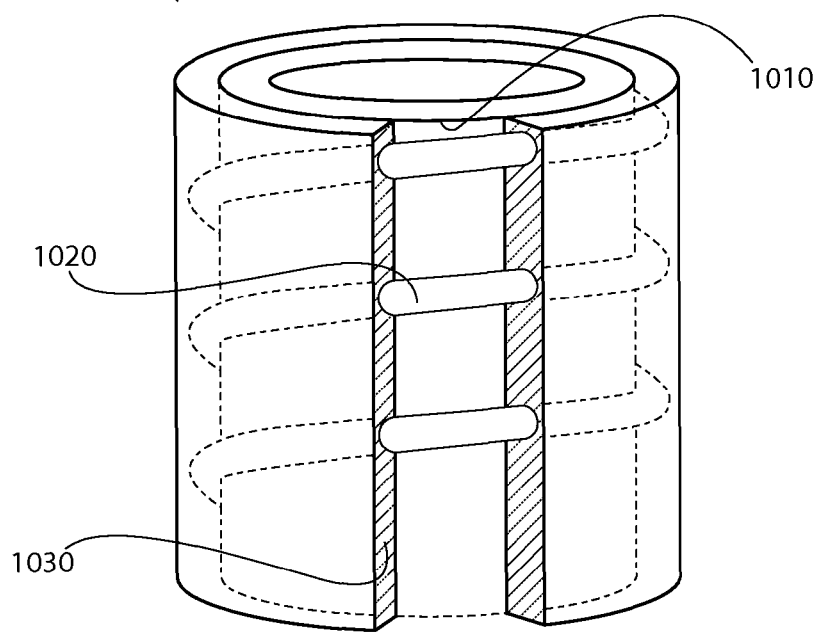
FIG. 11 depicts another example hose.

FIG. 11 depicts another example hose.

The hose 1000 includes an inner hose layer 1010. The inner hose layer 1010 can be made from a first material. The first material can be ETFE, nylon, fluoropolymer, thermoplastic elastomer, thermoplastic, MLLDPE, MLDPE, MHDPE, LLDPE, LDPE, HDPE, PP, EPC, or the like.

A reinforcement layer can be located about the inner hose layer 1010. The reinforcement layer includes a spring 1020 and a second material 1030. The spring 1020 can be placed about the inner hose layer 1010. The second material 1030 can encapsulate the spring 1020 and chemically bond with the inner hose layer 1010. The second material can be ETFE, nylon, fluoropolymer, thermoplastic elastomer, thermoplastic, MLLDPE, MLDPE, MHDPE, LLDPE, LDPE, HDPE, PP, EPC, or the like.

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents.

We claim:

1. A cable comprising:
   a hose configured to allow pressurized air to pass therethrough, wherein the hose comprises three layers comprising: an inner hose layer that is a first material, wherein the first material comprises at least one of linear low density polyethylene, Low-density polyethylene high-density polyethylene, polypropylene, or ethylene-propylene copolymer, a reinforcement layer that includes a spring disposed about the inner hose layer and encapsulated by a second material that is different from the first material, wherein the second material is nylon, and wherein a tie layer bonds with the first material and second material is located between the inner hose layer and reinforcement layer, and an outer hose layer, wherein the inner hose layer is bonded with the second material, and wherein the outer hose layer is bonded with the second material;
   at least one conductor located about the hose;
   a first strength member layer located about the at least one conductor;
   a second strength member layer located about the first strength member layer;
   a first jacket located about the second strength member layer, wherein the first jacket is fiber-reinforced; and
   a second jacket located about the first jacket, wherein the second jacket is a contrasting color to the first jacket.

2. The cable of claim 1, wherein the first jacket is made from a polymer.

3. The cable of claim 1, wherein the second jacket is made from a polymer.

4. The cable of claim 1, wherein the first strength member layer comprises a plurality of coated strength members.

5. The cable of claim 1, wherein the second strength member layer comprises another plurality of coated strength members.

6. The cable of claim 1, wherein a tie layer is located between the first jacket and the second jacket.

7. The cable of claim 6, wherein the first jacket is made from nylon and the second jacket is made from a fluoropolymer.

8. The cable of claim 1, wherein the first jacket is made from a polymer.

9. The cable of claim 1, wherein the second jacket is made from a polymer.

10. The cable of claim 1, wherein the first strength member layer comprises a plurality of coated strength members.

11. A cable comprising:
    a hose configured to allow pressurized air to pass therethrough, wherein the hose comprises three layers comprising: an inner hose layer that is a first material, wherein the first material comprises at least one of linear low density polyethylene, Low-density polyethylene high-density polyethylene, polypropylene, or ethylene-propylene copolymer, a reinforcement layer that includes a composite tape wrapped about the inner hose layer, wherein gaps are formed between portions of the composite tape, and wherein a second material encapsulates the composite tape and bonds with the first material, wherein the second material is not the same as the first material, wherein the second material is nylon, and wherein a tie layer bonds with the first material and second material, and an outer hose layer, wherein the outer hose layer is bonded with the reinforcement layer;
    at least one conductor located about the hose;
    a first strength member layer located about the at least one conductor;
    a second strength member layer located about the first strength member layer;
    a first jacket located about the second strength member layer, wherein the first jacket is fiber-reinforced; and
    a second jacket located about the first jacket, wherein the second jacket is a contrasting color to the first jacket.

* * * * *